United States Patent [19]  [11] 4,346,024
Coquard et al.  [45] Aug. 24, 1982

[54] HEAT-STABLE POLYPHASE POLYAMIDE/POLYESTERAMIDE COMPOSITIONS

[75] Inventors: Jean Coquard, Grezieu La Varenne; Jean Goletto, Ecully, both of France

[73] Assignee: Rhone-Poulenc Industries, Paris, France

[21] Appl. No.: 213,473

[22] Filed: Dec. 5, 1980

[30] Foreign Application Priority Data

Dec. 10, 1979 [FR] France .................................. 79 30649
Mar. 5, 1980 [FR] France .................................. 80 05271

[51] Int. Cl.³ ..................... C08L 67/08; C08L 77/02; C08L 77/12
[52] U.S. Cl. ................................... 524/219; 524/606; 525/425; 525/434; 525/420.5
[58] Field of Search ............ 260/18 N, 22 D, 22 CQ; 525/408, 411, 425, 434

[56] References Cited

U.S. PATENT DOCUMENTS

| | | | |
|---|---|---|---|
| 3,636,135 | 1/1972 | Garforth | 525/434 |
| 3,650,999 | 3/1972 | Martins | 525/425 |
| 3,655,821 | 4/1972 | Lofquist | 525/425 |
| 3,660,356 | 5/1972 | Radlmann | 525/425 |
| 3,839,245 | 10/1974 | Schlossman | 260/22 D |
| 4,097,445 | 6/1978 | Martins | 525/425 |
| 4,115,475 | 9/1978 | Foy | 525/425 |
| 4,165,303 | 8/1979 | Schlossman | 260/18 N |
| 4,230,838 | 10/1980 | Foy | 525/411 |
| 4,238,582 | 12/1980 | Deleens | 260/18 N |
| 4,252,920 | 2/1981 | Deleens | 525/425 |

*Primary Examiner*—Paul Lieberman
*Attorney, Agent, or Firm*—Burns, Doane, Swecker & Mathis

[57] ABSTRACT

Heat-stable polyphase polyamido compositions having improved mechanical properties are comprised of (i) from 55 to 99% by weight of a nylon polyamide resin matrix, said polyamide resin having a number-average molecular weight of at least 5,000, and (ii) from 1 to 45% by weight of a particulate disperse phase, said particulates having a particle size ranging from 0.01 to 10$\mu$, and said disperse phase comprising a polyesteramide having a content in amide groups of less than 40% of the amide groups comprising said polyamide matrix resin and a glass transition temperature of less than 5° C.

12 Claims, No Drawings

HEAT-STABLE POLYPHASE POLYAMIDE/POLYESTERAMIDE COMPOSITIONS

BACKGROUND OF THE INVENTION

1. Field of the Invention

The present invention relates to novel polyamide-based compositions having improved properties of impact strength, ductility and crystallinity, together with markedly enhanced heat stability.

2. Description of the Prior Art

Unmodified polyamides which possess high break strengths are considered to be tough polymers. In contrast, same are typically rather lacking or deficient as regards cracking and resistance to the propagation of cracks, which is the result of a certain sensitivity to chipping or notching and, possibly, of breakage due to embrittlement. This tendency to break as a result of being brittle rather than ductile substantially limits the uses of such polyamides and their reliability.

Improvement in the impact strength of thermoplastic polyamides has been studied in detail and numerous solutions to the problem have been proposed. Thus, British Pat. No. 998,439 features a composition comprising a mixture of 50 to 99% of a linear polyamide and 1 to 50% of an olefinic copolymer containing from 0.1 to 10 mol percent of acid functions, dispersed in the polyamide in the form of particles having a diameter of less than 5 microns.

U.S. Pat. Nos. 3,388,186 and 3,465,059 feature mixtures of polycaproamide and olefin copolymers containing from 1 to 20 mol % of (meth)acrylic acids or derivatives thereof, onto which an aminoacid has been grafted.

U.S. Pat. No. 3,668,274 describes mixtures of polyamides and 2.5 to 30% of a multiphase polymer comprising carboxyl functions, consisting of a first elastomeric phase (50 to 99.9% of an alkyl acrylate and butadiene) onto which a more rigid copolymer, containing from 1 to 50% by weight of an unsaturated carboxylic acid, has been grafted.

U.S. Pat. No. 3,845,163 describes mixtures of 60 to 80% by weight of a polyamide and 15 to 40% by weight of an α-olefin copolymer containing from 1 to 8 mol % of an α,β-ethylenic carboxylic acid in which at least 10% of the acid functions have been neutralized by metal ions. French Pat. No. 2,311,814 features a very large number of multiple-phase polyamide compositions having improved toughness, which consist of mixtures produced in the molten state from 60 to 99% by weight of a polyamide and 1 to 40% by weight of at least one other phase containing particles of at least one polymer having a modulus under traction of less than 1/10 of that of the polyamide, which "adheres" to the polyamide and the particle size of which is between 0.01 and 3 microns. The polymers which can be used as the disperse phase are selected from among the non-cross-linked, linear or branched chain thermoplastic or elastomeric polymers belonging to the following chemical families:

(i) Copolymers of unsaturated monomers and molecules which generate adherent sites, such as: carbon monoxide, carboxylic acids having α,β-ethylenic unsaturation, or derivatives thereof, unsaturated epoxides and residues of an aromatic sulfonylazide substituted by carboxylic acids;

(ii) Polyurethanes derived from polyester-glycols or polyether-glycols; and (iii) Polyether network polymers obtained by reacting epoxide monomers.

The majority of the polymeric additives mentioned or noted in the prior art have a relatively low thermal or chemical stability, and this limits their use in the fields of conventional polyamides, in which the conditions of preparation or processing are very harsh. Thus, the polyurethanes and polyether network polymers described in French Pat. No. 2,311,814, supra, can reasonably be used only in conjunction with matrices having melting points below 200°–220° C.

The very large number of copolymers of olefins and acrylic derivatives described in the prior art also undergo very substantial decomposition when they are mixed, in the molten state, with polyamides having a high melting point, such as, for example, polyhexamethylene adipamide.

The use of polyesteramides which are at least partially obtained from dimeric acid, as a reinforcing phase for thermoplastic compositions comprising a polyamide matrix, has not been described heretofore. German Offenlegungsschrift No. 2,635,226 discloses solventless printing inks based on polyamide and/or polyesteramide. However, these mixtures have low melting points and a low viscosity in the molten state. Mixtures of this type thus have properties diametrically opposed to those featured herein and involve the use of means different from those hereby proposed.

French published Application No. 78/08,391 discloses compositions which consist of a polyamide prepared from ω-aminocarboxylic acids or lactams, and of a random polyetheresteramide prepared from 107-aminocarboxylic acids or lactams, an α,ω-dihydroxy-polytetrahydrofuran having a molecular weight of 160 to 3,000, and a dicarboxylic acid. However, compositions of this type do not possess both high rigidity and high resilience. Furthermore, the structure of the polyetheresteramide described is fundamentally different from that of the polyesteramides consistent herewith.

SUMMARY OF THE INVENTION

Accordingly, a major object of the present invention is the provision of novel polyamide-based polyphase compositions which have improved physical properties and which are particularly stable at high temperature, such compositions being characterized in that they essentially consist of 55 to 99% by weight of a matrix-forming phase, which is a polyamide resin having a number-average molecular weight of at least 5,000, and 1 to 45% by weight of at least one other disperse phase in the form of particles having a size of between 0.01 and 10μ, either wholly or partially consisting of a polymer selected from among the polyesteramides having a proportion of amide groups of less than 40% of that of the matrix-forming polyamide resin and having a glass transition temperature below 5° C.

By the term "polyphase composition" there is intended a composition consisting of at least two phases which remain differentiated both in the solid state and in the molten state. A distinction is drawn between the main phase or matrix and the reinforcing phase or phases which is dispersed in said matrix.

By the expression "essentially consist of", there is intended that, in addition to the matrix-forming polyamide resin and the disperse phase or phases, other constituents can be present in the composition, provided that the essential characteristics of said composition are not substantially modified by these constituents.

By the expression "at least one other disperse phase in the form of particles having a size of between 0.01 and 10 microns", there is intended that at least one disperse phase in the form of particles having a maximum size of 0.01 to 10 microns, based on polyesteramide as defined herein, is present in the composition. A certain minor proportion of one or more other polymers in the form of particles of 0.01 to 10 microns can also be present.

By the expression "either wholly or partially consisting of a polymer selected from among the polyesteramides...", there is intended one or more polyesteramides as defined herein constituting the disperse phase, which can also contain a certain proportion of other polymers, provided that the essential characteristics of the composition are not impaired.

This other polymer or these other polymers in a minor proportion, which may be present in the disperse phase in addition to the polyesteramide disperse phase, may consist of reinforcing polymers, such as those described in the aforesaid prior art patents.

DETAILED DESCRIPTION OF THE INVENTION

More particularly, the matrix-forming polyamide resin in the compositions according to the invention is a resin well known to the prior art and includes the semi-crystalline and amorphous resins having a molecular weight of at least 5,000 and commonly referred to as the nylons. The polyamides which can be used include those described in U.S. Pat. Nos. 2,071,250, 2,071,251, 2,130,523, 2,130,948, 2,241,322, 2,312,966, 2,512,606 and 3,393,210. The polyamide resin can be prepared by condensing equimolar amounts of a saturated dicarboxylic acid containing from 4 to 12 carbon atoms, with a diamine, the diamine containing from 4 to 14 carbon atoms. It is possible to employ an excess of diamine, so as to obtain an excess of amine end groups, relative to the carboxyl end groups in the polyamide, or to use an excess of diacid, so as to obtain an excess of carboxyl end groups, relative to the amine end groups in the polyamide.

In order to be able to control the molecular weight of the polymers obtained, a chain terminator is typically employed. This chain terminator is used in an amount which depends on the desired molecular weight range. However, from 0.1 to 2 mol %, relative to the salts, is generally employed.

The chain terminators are selected from the group comprising carboxylic acids and aliphatic amines. Examples of polyamides include polyhexamethylene adipamide (nylon-6,6), polyhexamethylene azelamide (nylon-6,9), polyhexamethylene sebacamide (nylon-6,10) and polyhexamethylene dodecanamide (nylon-6,12), polyamides produced by the ring opening of lactams, namely, polycaprolactam and poly-(lauryllactam), poly-(11-aminoundecanoic acid) and poly-bis-(para-aminocyclohexyl)-methane dodecanamide. In the present invention, it is also possible to use polyamides prepared by the copolymerization of two of the above polymers or by the terpolymerization of the above polymers of their constituents, for example, a copolymer of adipic acid, isophthalic acid and hexamethylenediamine. Preferably, the polyamides are linear and have a melting point above 200° C.

The polyesteramides constituting the reinforcing phase or phases dispersed in the matrix are polyesteramides prepared from:
(a) Acid compounds consisting of from 1 to 100% of dimeric acid and from 0 to 99% of another diacid, or of a mixture of diacids or other difunctional reactants which generate acid groups or are derived from acid groups and can contain other groups, which compounds are chemically stable under the polymerization conditions and preferably have a number of carbon atoms which is less than 13 in the case of the diacids and less than 25 in the case of the difunctional derivatives;
(b) A short-chain linear, branched or cyclic diol having a number of carbon atoms which is preferably between 2 and 8, and/or a polydiol, such as polyethylene glycols or polytetrahydrofurans having a molecular weight which is preferably between 500 and 3,000; and
(c) A preferably short-chain diamine having a number of carbon atoms which is less than or equal to 12, or a mixture of such diamines, it being possible for such diamines to contain an inert hetero-atom, such as, for example, oxygen or sulfur, in their chain.

By the term "dimeric acids", there is intended polymeric fatty acids obtained by the fractionation of fatty acids and containing more than about 95% by weight of dimers. The term "fatty acids" is to be understood as meaning saturated or unsaturated aliphatic monoacids having from 8 to 24 carbon atoms.

Among the linear or branched chain saturated fatty acids, exemplary are: caprylic, pelargonic, capric, lauric, myristic, palmitic and isopalmitic, stearic, arachidic, behenic and lignoceric acids.

Among the linear or branched chain fatty acids with ethylenic unsaturation, exemplary are: oct-3-enoic, dodec-11-enoic, lauroleic, myristoleic, palmitoleic, gadoleic, cetoleic, linoleic, linolenic, eicosatetraenoic and chaulmoogric acids. Certain acids having acetylenic unsaturation can also provide polymeric acids, but same do not exist in an advantageous manner in the natural state and their economic value is therefore very low.

The polymeric fatty acids obtained by polymerization, most frequently in the presence of peroxides or Lewis acids, can be fractionated. They can also be hydrogenated in order to reduce their degree of unsaturation and thus to reduce their coloration.

The most commonly used starting materials are compositions which originate from hydrogenated oleic and linoleic acids and which contain: from 1 to 15% by weight of monobasic acid, from 80 to 98% by weight of dibasic acid and from 1 to 25% by weight of tribasic acid or acids of higher basicity.

Compositions in which the fraction of dimeric acid is greater than 95% are more preferably used according to the invention. Dimeric acids in which the proportion of monofunctional acid is less than 1% by weight, and in which the proportion of acid having more than two functional groups is less than 5% by weight and preferably less than 3% by weight, are preferred.

The other diacids or difunctional compounds which generate acid groups or are derived from acid groups and can contain other groups preferably include compounds such as esters or products resulting from the reaction of an ester and a diamine, such as, for example, the product resulting from the reaction of hexamethylenediamine and dimethyl terephthalate.

The other polymers which can comprise the disperse phases of the compositions according to the invention are advantageously those polymers which are totally or partially miscible, within a temperature range of between 20° C. and 300° C., with the polyamides used for the disperse phase. The polymers having this characteristic and bearing functional groups which are reactive towards the polyamides or polyesters are of particular value as agents for crosslinking the polyesteramides used as the reinforcing phase according to the invention.

The compositions according to the invention can of course be modified by one or more typical additives, such as stabilizers and inhibitors of degradation by oxidation, by ultraviolet radiation or light, or by heat, lubricants and mold-release agents, colorants comprising dyestuffs and pigments, fibrous and particulate fillers and reinforcements, nucleating agents, plasticizers, and the like.

The stabilizers, for example, can be incorporated into the composition at any stage of the preparation of the thermoplastic composition. Preferably, the stabilizers are included fairly early in order to prevent degradation from starting before the composition can be protected. These stabilizers must be compatible with the composition.

The oxidation and heat stabilizers which can be used in the compositions of the present invention include those generally used in polyamides. They include, for example, up to 1% by weight, relative to the weight of the polyamide, of halides of Group I metals, for example, sodium, potassium and lithium, with copper halides, for example, the chloride, the bromide and the iodide, sterically hindered phenols, hydroquinones and various substituted members of these groups and combinations thereof.

The ultraviolet stabilizers, which are present, for example, in a proportion ranging up to 2%, relative to the weight of polyamide, can also be those normally used with polyamides.

Examples which may be mentioned are various substituted resorcinols, salicylates, benzotriazoles, benzophenones, and the like.

It is also envisaged to use antioxidant compounds of known types, such as substituted aromatic amines. An example of a compound of this type is 4,4'-bis-($\alpha$, $\alpha'$-dimethylbenzyl)-diphenylamine.

Lubricants and mold-release agents which can be used, for example, in a proportion ranging up to 1.0%, relative to the weight of the composition, are stearic acid, stearyl alcohol and stearylamides; organic dyestuffs and pigments, for example, titanium dioxide, carbon black and the like, can be used in proportions ranging up to 5% by weight.

The fibrous or particulate fillers and reinforcements, for example, carbon fibers, glass fibers, amorphous silica, asbestos, calcium silicate, aluminum silicate, magnesium carbonate, kaolin, chalk, powdered quartz, mica, feldspar and the like, can be present in proportions ranging up to 50%, relative to the weight of the composition, insofar as the desired mechanical properties are not substantially impaired.

The compositions can also contain nucleating agents, for example, talc, calcium fluoride, sodium phenylphosphinate, alumina and finely divided polytetrafluoroethylene, and the like, and plasticizers, in proportions ranging up to about 20%, relative to the weight of the composition, for example, dioctyl phthalate, dibenzyl phthalate, butyl benzyl phthalate, hydrocarbon oils, N-n-butylbenzenesulfonamide, ortho- and paratoluene-ethylsulfonamides and the like.

Any process permitting the dispersion of one phase in the other is suitable. The formulation is advantageously carried out, however, with polymers in the molten state, under shear conditions which make it possible to disperse the reinforcing polymer or polymers, in the polyamide matrix, as particles having dimensions of between 0.01 and 10 microns and preferably between 0.05 and 5 microns.

Equipment of the BUSS type or a single-screw or multi-screw extruder, which may or may not be equipped with a degassing system, is suitable for carrying out this dispersion.

The reinforced thermoplastic compositions can facilely be converted into a wide variety of useful shaped articles by means of conventional compression-molding or extrusion-molding techniques typically used in the manufacture of thermoplastic-shaped articles, such as molded pieces, extruded products, for example, tubes, films, sheets, fibers and oriented fibers, laminates, and wire coverings and coatings.

The compositions according to the invention are characterized by a notable combination of properties, the most important of which being a remarkable toughness, taking into account the amount of reinforcing polymer present in the polyamide matrix and its tendency to crystallize.

This combination or properties, and particularly the elasticity, even at low temperature, makes it possible to use the subject compositions in a very large number of applications, in particular in the fields of mechanics, aviation, automotive, electronics and tools.

In order to further illustrate the present invention and the advantages thereof, the following specific examples are given, it being understood that same are intended only as illustrative and in nowise limitative.

In the following examples, a certain number of determinations were carried out on the primary constituents are the polyamides resulting therefrom. Likewise, various properties of the compositions were measured. The procedures or specifications in accordance with which the aforesaid determinations or analyses were carried out are set forth below.

1. Conditioning of the polymers at EH O

The molded test-pieces were placed in a desiccator over silica gel and dried for 24 hours at ambient temperature under 0.5 to 1 mm of mercury before carrying out the measurements.

2. Notch impact strength

The Charpy notch impact strength was measured in accordance with ISO Recommendation R 179.

The determinations were carried out on molded bars having the following dimensions: length=50±0.1 mm; width=6±0.2 mm; thickness=4±0.2 mm; length of the notch=0.8±0.1 mm; thickness under the notch=2.7 ±0.2 mm.

A ZWICK impact meter was used at 23° C., the test-pieces having been conditioned at EH O.

The result is expressed in Joules/cm$^2$.

3. Flexural modulus at EH O and 23° C.

This determination was carried out on injection-molded 80×10×4 mm bar-type test-pieces in accordance with ISO Recommendation R 178.

4. Determination of end groups $NH_2$: Automatic potentiometric determination of the solution of polymer in a 90/10 by weight mixture of phenol and water, using HCl. The result is given in gram equivalents per $10^6$g of polymer.

COOH: Hot dissolution of the polymer in benzyl alcohol, under a nitrogen atmosphere, and acidimetric determination of this hot solution, under nitrogen, using a glycolic solution of potassium hydroxide in the presence of phenolphthalein. The result is given in gram equivalents per $10^6$ g of polymer.

5. Determination of inherent viscosity

The dried polymer was dissolved in meta-cresol to provide an 0.5% strength solution. The flow time of this solution was measured in comparison with that of the pure solvent. The value of the inherent viscosity is given by the formula:

$\eta inh = 4.6 (\log t_1 - \log t_o)$
$t_1$ = flow time of the solution
$t_o$ = flow time of the solvent

6. Microcalorimetric analysis

The polymers or the mixtures of polymers are characterized by their intrinsic viscosity and also by melting and crystallization characteristics, such as the melting point, Mp, and the crystallization point on cooling, CpC, the difference between the two constituting the supercooling $\Delta$ which characterizes nucleation. Another crystallization characteristic, which is essentially related to the crystallite growth rate, is based on the determination of tg $\alpha$, $\alpha$ being the angle formed by the horizontal of the base line with the initial part of the peak of the crystallization exotherm on cooling under strict conditions of observation, the horizontal of the base line and the peak of the crystallization exotherm being determined from the curve obtained from the differential microcalorimetric analysis of the sample studied.

These determinations were carried out on a sample subjected to both increasing and decreasing temperature variations of 10° C./minute.

The improvement in the crystallization of the compositions according to the invention can be assessed either by the decrease in $\alpha$, compared with the coefficient $\Delta$ of the polyamide matrix, or also by the increase in tg $\alpha$, which characterizes the acceleration of crystallite growth.

7. Glass transition temperature

The glass transition temperature corresponds to the sudden drop in the shear modulus as a function of the temperature. It can be determined from the graph representing the variations in the torsional modulus as a function of the temperature, these variations being measured by thermomechanical analysis using an automatic torsion pendulum.

The characteristics of the matrix used in the following examples are now specified:

Polyhexamethylene adipamide $\eta inh$: 1.173 dl/g
COOH end groups: 66.07
$NH_2$ end groups: 45.83
Notch impact strength: 0.56±0.05 J/cm$^2$
Flexural modulus: 2,400±200 MPa/mm$^2$
Tg by thermomechanical analysis: 55°
Mp: 260° C. CpC=210° C. $\Delta$=50° C. tg $\alpha$=17
Proportion of amide groups per 100 g: 0.885

EXAMPLE 1

Preparation of polyesteramide from dimeric acid, ethylene glycol and hexamethylenediamine:

The reaction was carried out in a 7.5 liter stainless steel autoclave fitted with an anchor-type stirrer equipped with a tachometric dynamo.

The following reactants were introduced into the autoclave at ambient temperature:

Fatty acid dimer having a monomer content of 0.03% and a trimer content of about 3% (marketed under the name Empol 1010 by Unilever Emery): 892.04 g (1.289 mols)

Pure crystalline hexamethylenediamine: 141.23 g (1.217 mols)

The amounts of these reactants introduced were calculated so as to prepare a prepolyamide of molecular weight 3,000, containing COOH end groups.

The reactants were introduced at ambient temperature, the apparatus was carefully purged under nitrogen and the temperature of the mass was then raised to 270° C. over the course of 2 hours, under stirring. The reaction mass was subsequently maintained at 270° for 45 minutes and then brought back to ambient temperature.

The following reactants were then introduced into the autoclave:

Dimeric acid: 1,915.6 g (3.323 mols)
Ethylene glycol: 339.7 g (5.478 mols)
Titanium glycolate: 0.5 g The apparatus was again carefully purged under nitrogen and the temperature of the mass was then raised to 200° C. over the course of 1 hour 15 minutes, under stirring, in order to cause the water to distil. The temperature was then raised to 270° over the course of 1 hour 15 minutes. A vacuum was then established over the course of 1 hour 30 minutes until it reached 0.4–0.5 mm Hg. Polycondensation was then carried out at 270° C. for 1 hour 15 minutes under 0.4–0.5 mm Hg.

The polymer was subsequently drawn off under nitrogen pressure and collected in water, and it was then converted to granules after cooling in liquid nitrogen.

The characteristics of the resulting product are reported in the Table I which follows.

EXAMPLE 2

Preparation of polyesteramide from dimeric acid, sebacic acid, ethylene glycol and hexamethylenediamine (HMD)

In a first stage, a polyamide of dimeric acid/sebacic acid (70/30 w/w) and hexamethylenediamine was prepared under the conditions required to obtain a molecular weight of 2,000 and a polyamide with COOH end groups.

The following reactants were introduced into a 1 liter Pyrex reactor at ambient temperature:

Dimeric acid: 319.4 g (0.554 mol)
Sebacic acid: 260.2 g (1.288 mols)
Pure crystalline HMD: 170 g (1.467 mols)

The apparatus was carefully purged under nitrogen and the temperature of the mass was raised to 265° over the course of 2 hours, under stirring. The resulting reaction mass was prefectly homogeneous. Same was maintained at 265° C. for 1 hour 15 minutes. The resulting polymer was drawn off into water and then ground and dried at 100° in an oven in vacuo. The characteristics of the resulting copolyamide were as follows:
COOH end groups: 982.5
$NH_2$ end groups: 2.8
Mp by differential thermal analysis: 185° C.
Molecular weight based on end groups: 2,070
The following reactants were introduced into a 7.5 liter stainless steel autoclave at ambient temperature:
Prepolyamide,
previously prepared: 522.6 g
Ethylene glycol: 307.7 g (4.962 mols)
Dimeric acid: 1,744.5 g (3.026 mols)
Titanium glycolate: 0.414 g The apparatus was carefully purged under nitrogen, the mass was stirred and its temperature was raised to 270° C. over the course of 2 hours 15 minutes. A vacuum was established over the course of 1 hour 15 minutes until it reached 0.3 mm Hg. Stirring was maintained for 2 hours 30 minutes at 270° C. under 0.3 mm Hg. The polymer was subsequently drawn off under nitrogen pressure, collected in water and then converted to granules after cooling with liquid nitrogen.

The characteristics of the resulting product are reported in the Table I which follows.

tion of the COOH groups, carried out on the residue, indicated 0.0642 COOH/100 g.

2,800 g of the product prepared above were maintained in the same autoclave and the following reactants were then added:
Polyamide of dimeric acid/sebacic acid and hexamethylenediamine, of molecular weight 2,000 and containing COOH end groups (identical to the polyamide described in the preceding example): 650 g (0.06857 COOH)
Ethylene glycol: 154 g (2.4833 mols)
Titanium glycolate: 0.945 g The apparatus was carefully purged under nitrogen and the temperature of the mass was raised to 250° C. over the course of 1 hour and then maintained for 1 hour. A vacuum was then established over the course of 1 hour 15 minutes until it reached 0.3 mm Hg. Polycondensation was carried out at 250° C. for 1 hour 45 minutes under 0.3 mm Hg. The polymer was drawn off under nitrogen pressure, cooled in water and then converted to granules after passing through a mixture of acetone and solid carbon dioxide. The characteristics of the resulting product are reported in the Table I which follows:

TABLE I

| EXAMPLE | Inherent viscosity in an 0.5% strength solution in m-cresol at 25° C., in dl/g | *Thermal characteristics of the melting endotherms | Softening point (Kofler bench), °C. | Thermomechanical characteristics under torsion using an automatic pendulum | | | |
|---|---|---|---|---|---|---|---|
| | | | | Tg °C. | Torsional modulus, MPa | | |
| | | | | | −20° C. | 0° C. | 20° C. |
| 1 | 0.71 | not observed | 45–50 | −50 | 10 | 9 | 9 |
| 2 | 0.84 | 55° C. | 50 | −49 | 8.5 | 8.3 | 8 |
| 3 | 1.18 | 17° C. | 50–60 | −75 | 40 | 23 | 5.5 |

*The thermal characteristics were determined by differential microcalorimetry under nitrogen, with a temperature increase of 10° C. per minute

EXAMPLE 3

Preparation of polyetheresteramide from dimeric acid, polytetrahydrofuran (poly-THF), sebacic acid and ethylene glycol (1) Condensation of dimeric acid and poly-THF of molecular weight 2,000:
The following reactants were introduced into a 7.5 liter stainless steel autoclave:
Dimeric acid: 1,180.7 g (2.048 mols)
Poly-THF (of trademark TERACOL 2000): 2,048 g (1.024 mols)

The apparatus was carefully purged under nitrogen, the mass was stirred and its temperature was raised to 250° C. over the course of 2 hours. A vacuum was then established over the course of 1 hour until it reached 0.3 mm Hg. The reaction mass was maintained at 250° C. for 2 hours under 0.3 mm Hg. The mass was then brought back to ambient temperature. The determina- EXAMPLES 4 to 6

Preparation of the compositions

The polyamide-6,6-granules were dried for 15 hours at 110° C. under 1 to 2mm Hg, the polyesteramide granules were dried for 48 hours at ambient temperature under 1 to 2 mm Hg, and the two were then mixed, before extrusion, moisture uptake being avoided.

The mixture of granules was extruded using an extruder of trademark Thoret, having a screw diameter of 20 mm and a length of 400 mm, with a die having a diameter of 2.5 mm, at a temperature of 275° C. The resulting rod was cooled by passing it through a bath of water and was then converted to granules.

The characteristics of the compositions obtained by mixing 20% by weight of the polyesteramides of Examples 1 to 3 and 80% of polyamide-6,6 are reported in the Table II which follows:

TABLE II

| EXAMPLE | Reinforcing phase | | Thermal characteristics under $N_2$ | | Particle size | Mechanical characteristics at EH O and at 23° C. | |
|---|---|---|---|---|---|---|---|
| | Nature | Proportion, % | Δ | tg α | | Flexural modulus in MPa | Charpy notch impact strength in $J/cm^2$ |
| 4 | Example 1 | 20 | 33 | 54 | 1–5 | 1,820 ± 60 | 1.6–1.9 |
| 5 | Example 2 | 20 | — | — | 1–5 | 1,800 ± 50 | 2.2 |
| 6 | Example 3 | 20 | — | — | 1–5 | 1,800 ± 50 | 3.0 |
| Control polyamide- | | | | | | | |

TABLE II-continued

| EXAMPLE | Reinforcing phase | | Thermal characteristics under $N_2$ | | Particle size | Mechanical characteristics at EH O and at 23° C. | |
| --- | --- | --- | --- | --- | --- | --- | --- |
| | Nature | Proportion, % | Δ | tg α | | Flexural modulus in MPa | Charpy notch impact strength in J/cm² |
| 6,6 | 0 | 0 | 50 | 17 | — | 2,400 ± 200 | 0.5 |

*The thermal characteristics were determined by differential microcalorimetry, utilizing temperature variations of 10° C./minute.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A heat-stable polyphase polyamido composition of matter having enhanced mechanical properties, comprising (i) from 55 to 99% by weight of a nylon polyamide resin matrix, said polyamide resin having a number-average molecular weight of at least 5,000, and (ii) from 1 to 45% by weight of a particulate disperse phase, which remains differentiated from the polyamide resin matrix both in the solid state and molten state, said particulates having a particle size ranging from 0.01 to 10μ, and said disperse phase comprising a polyesteramide having a content in amide groups of less than 40% of the amide groups comprising said polyamide matrix resin and a glass transition temperature of less than 5° C.

2. The composition of matter as defined by claim 1, comprising from 70 to 90% by weight of the matrix (i), the polyamide resin having a number-average molecular weight in excess of 10,000, from 10 to 30% by weight of the disperse phase (ii) comprising particulates having a particle size ranging from 0.05 to 5μ, and said polyesteramide having a glass transition temperature no greater than −30° C.

3. The composition of matter as defined by claim 1, the polyamide matrix resin being polycaprolactam or polyhexamethylene adipamide.

4. The composition of matter as defined by claim 2, the polyesteramide being prepared from (a) essentially difunctional monomers comprising at least one carboxylic acid function, or ester/amide-forming derivative thereof, at least 1 mol % of which comprising dicarboxylic acids or such derivatives thereof and having from 20 to 60 carbon atoms, and (b) a member selected from the group consisting of dihydroxyl and diamino comonomers therefor, or aminoalcohol comonomers, or mixtures of diamino and aminoalcohol comonomers.

5. The composition of matter as defined by claim 4, said polyesteramide comprising from 20 to 80% by weight of ester segments.

6. The composition of matter as defined by claim 5, the dicarboxylic acid comprising said polyesteramide and having from 20 to 60 carbon atoms being a fatty acid dimer.

7. The composition of matter as defined by claim 5, the comonomers (b) of said polyesteramide comprising dihydroxyl and diamino comonomers.

8. The composition of matter as defined by claim 7, said dihydroxyl comonomers being polytetramethylene glycols having molecular weights ranging from 500 to 5,000.

9. The composition of matter as defined by claim 7, said dihydroxyl comonomers being tetramethylene glycol.

10. The composition of matter as defined by claim 5, the essentially difunctional monomers (a) comprising said polyesteramide essentially consisting of a mixture of dimeric acids and linear acids having from 2 to 12 carbon atoms, or ester- or amide-forming derivatives thereof.

11. A shaped article comprising the composition of matter as defined by claim 1.

12. The composition of matter of claim 6 wherein the proportion of fatty acid dimer having more than two functional groups is less than 5% by weight.

* * * * *